(12) United States Patent
Fox, Jr.

(10) Patent No.: US 7,699,268 B2
(45) Date of Patent: Apr. 20, 2010

(54) SLING RELEASE MECHANISM

(76) Inventor: Roy L Fox, Jr., Route 1, Box 32 A, Belleville, WV (US) 26133

( * ) Notice: Subject to any disclaimer, the term of this patent is extended or adjusted under 35 U.S.C. 154(b) by 530 days.

(21) Appl. No.: 11/733,542

(22) Filed: Apr. 10, 2007

(65) Prior Publication Data

US 2008/0011902 A1    Jan. 17, 2008

Related U.S. Application Data

(60) Provisional application No. 60/790,653, filed on Apr. 10, 2006.

(51) Int. Cl.
*B64D 17/38* (2006.01)
(52) U.S. Cl. .............. 244/151 B; 24/DIG. 36
(58) Field of Classification Search .............. None
See application file for complete search history.

(56) References Cited

U.S. PATENT DOCUMENTS

| | | | |
|---|---|---|---|
| 2,502,097 A * | 3/1950 | Linder | 294/82.25 |
| 2,834,083 A | 5/1958 | Newell et al. | |
| 3,122,392 A | 2/1964 | Benditt et al. | |
| 3,466,081 A | 9/1969 | Femia | |
| 3,692,262 A * | 9/1972 | Gaylord | 244/151 A |
| 4,030,689 A | 6/1977 | Rodriguez | |
| 4,337,913 A | 7/1982 | Booth | |
| 4,339,098 A | 7/1982 | Tardot et al. | |
| 4,493,240 A | 1/1985 | Norton | |
| 4,592,524 A | 6/1986 | Nohren et al. | |
| 4,765,571 A | 8/1988 | Barbe | |
| 5,361,676 A * | 11/1994 | Gibbs | 89/1.14 |
| 5,618,011 A | 4/1997 | Sadeck et al. | |
| 5,703,315 A * | 12/1997 | Coggan | 89/1.14 |
| 5,887,825 A | 3/1999 | Noel | |
| 6,249,937 B1 | 6/2001 | Grenga | |
| 6,644,597 B1 | 11/2003 | Bahniuk | |
| 7,264,205 B2 * | 9/2007 | Fox, Jr. | 244/151 B |

* cited by examiner

*Primary Examiner*—Jack W. Lavinder
(74) *Attorney, Agent, or Firm*—Snell & Wilmer L.L.P.

(57) ABSTRACT

A sling release mechanism for releasing the sling of a drogue parachute from a descending aerially delivered cargo pallet. The sling release mechanism has a body, with which a pivot arm, an inner and an outer hinge plate articulate. The inner and outer hinge plates articulate in opposite directions when in use. The inner hinge plate has a cavity or receiver into which the end tip of the pivot arm may engage. The end of a parachute sling is placed over the pivot arm, and the pivot arm and inner hinge plate are articulated to engage the pivot pin end with the receiver of the inner hinge plate. The outer hinge plate is then articulated to engage the inner hinge plate, and is held in place with a releasable retainer. The parachute sling is released by releasing the retainer, allowing the outer and then the inner hinge plates to articulate, thereby releasing the pivot arm to articulate, after which the end of the parachute sling slides off the pivot pin. Other embodiments include multiple mechanisms for releasing a plurality of slings.

19 Claims, 7 Drawing Sheets

SLING RELEASE MECHANISM

PRIOR APPLICATIONS

Applicant claims the benefit of the filing data of Provisional Application, Ser. No. 60/790,653, entitled Sling Release Mechanism and filed Apr. 10, 2006

BACKGROUND OF THE INVENTION

1. Field of the Invention

The present invention relates to release mechanisms for releasing a deployed parachute from a suspended load in a controlled manner.

2. Description of the Prior Art

Aerial delivery is a means frequently used for transporting cargo quickly to areas of limited or hostile access, without the availability of any nearby airports. At times, people in isolated areas, such as jungles, deserts, mountains, polar regions, or combat zones, are in need of essential supplies, including food and medical supplies, but are not within access to an airport at which a supply plane could land. In these instances, aerial delivery of cargo from in-flight aircraft is the sole option. These aerial delivery systems involve the use of parachute systems to slow the descent and gently land the cargo platforms on the ground.

Similar parachute systems are further utilized for recovery of aeronautical and astronautical vehicles, including rocket boosters, experimental aircraft and space capsules, returning back to the earth's surface from flights in the upper atmosphere or outer space.

In these aerial delivery or recovery systems, a series of parachute deployments is often used to progressively slow the decent velocity of the payload. Use of a series of parachute deployments is often necessary because the force and impulse on the suspension lines and straps of a main parachute (i.e., one large enough to slow the cargo platform to an acceptable landing velocity) deploying at the terminal, free-fall velocity of the cargo platform would be excessive, causing the parachute system to fail. Instead, the cargo platform is typically slowed in a series of stages using subsequently larger parachutes.

A drogue parachute is typically deployed first from the parachute system. The drogue is a small parachute which can be easily deployed from its container by a tether attached to the launching cargo plane or by an easily deployed stored energy means such as a spring launched pilot parachute. As the drogue parachute is deployed and inflated, it moderately decelerates the suspended cargo platform, as well as orientating the cargo platform into its desired upright attitude, without excessive strain on the slings and parachute canopy from which the cargo platform is suspended. After a predetermined time period, the drogue parachute is released from the suspended cargo platform. The drag provided by the released drogue parachute is then utilized to pull and deploy the next, larger parachute. This next parachute may be the final, main parachute, or another intermediary parachute prior to another subsequent deployment of the main parachute, depending upon the size of the cargo platform and the design of the parachute system.

To accomplish this release design, the drogue parachute is attached to the suspended cargo platform by a release mechanism. The suspended cargo platform is suspended from the release mechanism typically by a series of suspension slings. The suspension slings maintain the suspended cargo platform in a stable, level attitude. The number of suspension slings is typically four, with one routed to each corner of a square or rectangular cargo platform supporting the suspended cargo. For larger platforms, a greater number of suspension slings may be used. The suspension slings converge at a point above the suspended load to the release mechanism, located at the apex of the pyramid formed by the suspension slings.

The drogue parachute may be attached to the release mechanism by a single sling or riser. From the top end of this sling, a number of suspension lines radiate to the perimeter of the drogue parachute canopy.

One common release mechanism is a pyrotechnic cord cutter powered by an explosive or pyrotechnic charge. This mechanism utilizes the detonation of a small explosive charge to drive a cutting blade through the suspension sling. For example, Norton, U.S. Pat. No. 4,493,240, disclosed a pyrotechnic cord cutter comprising an elongated cylindrical body with a lateral aperture proximate to one end of the body, through which passes the suspension line or other support line in the parachute system. A chamber is located at the other end of the body, containing an explosive charge. An opening is provided in the medial end of the chamber, into which is registered the rear end of a cutting blade. Upon detonation of the explosive charge in the chamber, the cutting blade is propelled through the aperture, severing the cord within.

The pyrotechnic cord cutters are typically usable only for relatively small-diameter cords. As the weight of a platform and payload increases, the size of the cord or strap between the parachute and payload platform increases. A pyrotechnic cord cutter for payloads above a moderate size becomes too large for practical handling and would incorporate an explosive charge too large and powerful for safe handling by personnel.

SUMMARY OF THE INVENTION

A sling release mechanism is provided for installation between an aerially descending cargo platform and its drogue parachute. The sling release mechanism is disposed on the platform or pallet supporting the delivery load. The parachute release mechanism has a body with a connection means located at its upper portion for connection to the sling of a drogue parachute. The release mechanism has one or more pivot arms. Each pivot arm is situated within the body and pivots about a common axle or pivot pin located in the body. Each pivot arm has a free end section with a shaped end section which engages with a latch apparatus.

In one embodiment, the latch mechanism is comprised of an inner and an outer hinge plate, each having a flat plate section with parallel inner and outer flat faces which articulate with the body. The inner face of the inner hinge plate has a receiver defined therein, which is shaped and adapted to receive the shaped end section of the pivot arm. The inner hinge plate will typically articulate with the body at its lower end, while the outer hinge plate will conversely hinge from its upper end. The two hinge plates are adapted and disposed on the body such that the inner latch plate can articulate to a point where its receiver is engaged by the shaped end section of the pivot arm, after a sling end loop has been placed thereon, and, in this position, the outer hinge plate can articulate to have its inner face lie flush against the outer face of the inner hinge plate. The outer hinge plate is then secured to the body with a retainer, and the retainer is provided with a release means.

In this configuration, the leverage provided by the two hinge plates allows the retainer to exercise a significantly augmented force to hold the shaped end section of the pivot arm in place within the receiver of the inner latch plate. This significantly reduces the necessary size of the retainer and the means to release the retainer from the outer hinge plate. In one embodiment, the retainer is a cut loop and the release means is a cord cutter. Because the cut loop in this invention needs only to be sufficiently strong to resist the torque on the outer hinge plate imparted by the pivot arm, which is only a small fraction of the weight of the platform, and not the entire weight of the payload platform, a much smaller cord, and thus a much smaller cord cutter may be used than in conventional release means.

The following detailed description is not to be taken in a limiting sense, and the scope of the present invention is best defined by the appended claims.

DETAILED DESCRIPTION OF THE PREFERRED EMBODIMENTS

Figure 1:
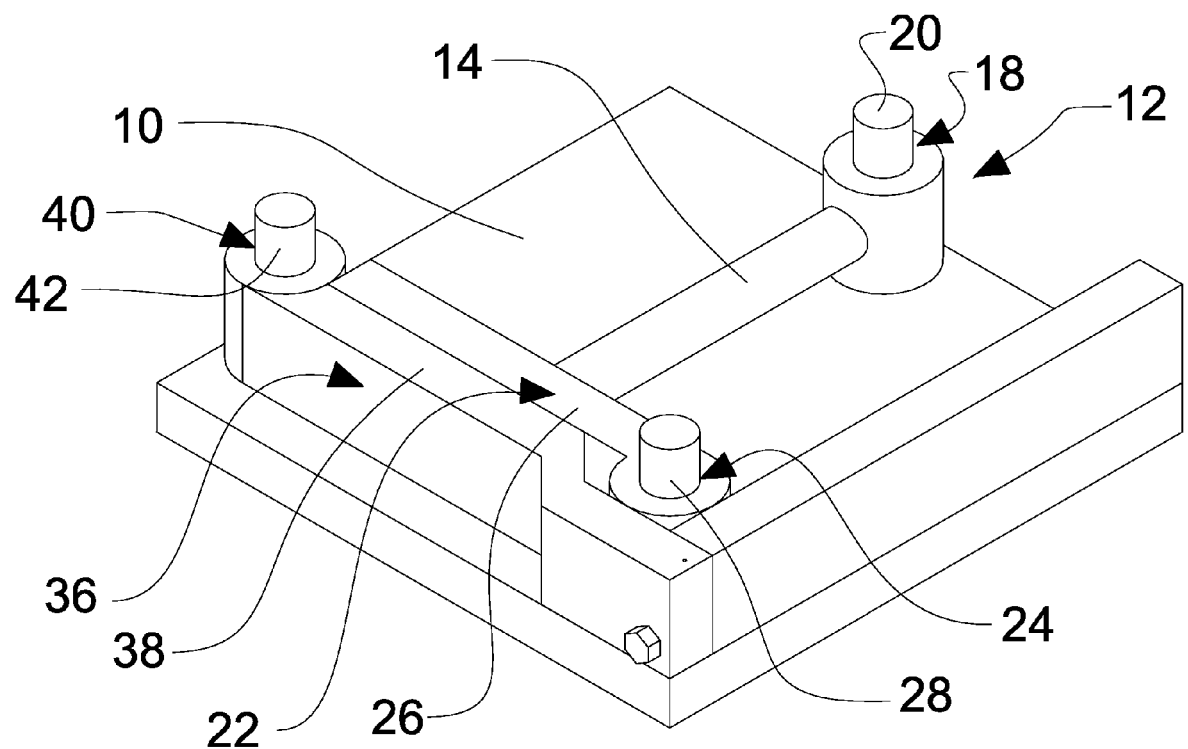
FIG. 1 is an isometric view of the preferred embodiment of the sling release mechanism.
Figure 2:
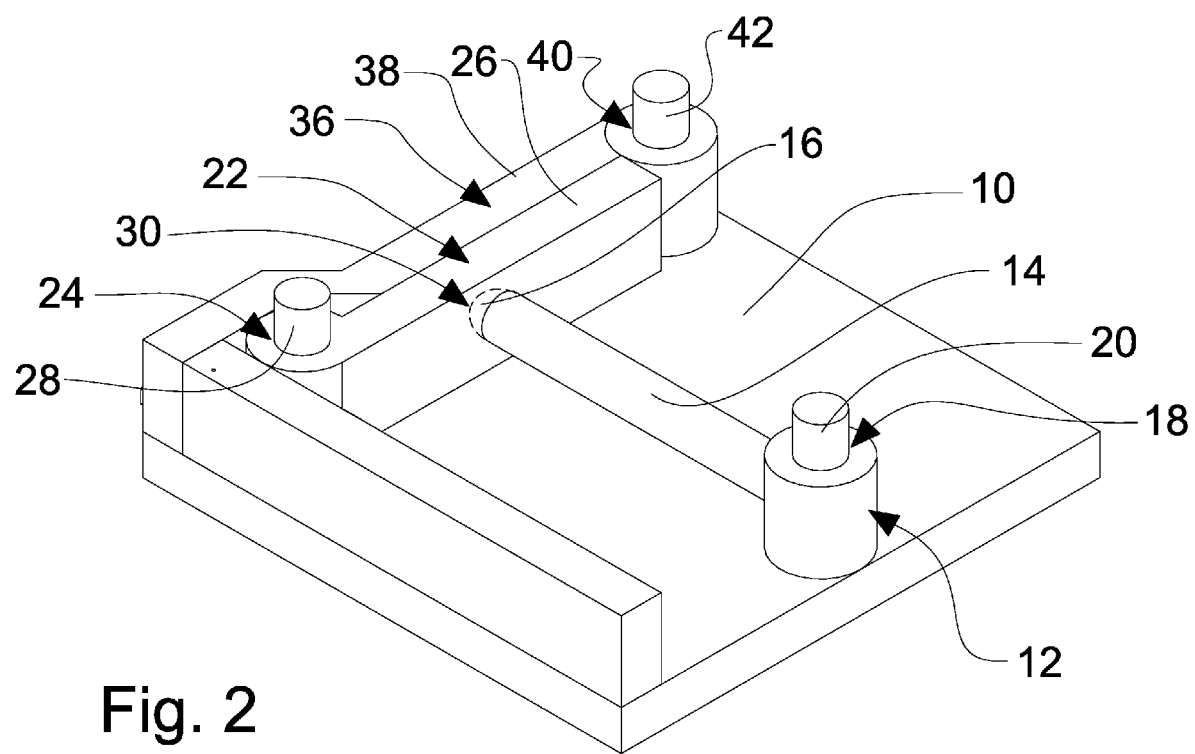
FIG. 2 is another isometric view of the preferred embodiment

As shown in FIGS. 1 and 2, a preferred embodiment of a sling release mechanism is comprised, first, of a body 10, which serves as the base or foundation upon which all other components are assembled. The base can be fabricated of any commonly known, structurally strong material, such as metal, including but not limited to steel, stainless steel, cast iron, aluminum, aluminum alloys, titanium or titanium alloys.

Attached to the body is a pivot arm 12. The pivot arm 12 has an elongated section 14. At one end of the elongated section 14 is a shaped end section 16 and at the other, a means for articulating with the body 10. This means for articulating with the body 10 comprises, preferably, an aperture 18. A first pin 20 or the like passes through the aperture 18 with minimal clearance and conjoins at one or both of its ends with the body 10. The pivot arm 12 can then freely articulate around the first pin 20. The shaped end section 16 is disposed at the opposite end of the elongated section 14 from the aperture 18.

The sling release mechanism further comprises an inner hinge plate 22. The inner hinge plate 22 generally is of the shape of an elongated flat plate 26 having one enlarged end section. The enlarged end section has an aperture 24 defined within it, the axis of the aperture 24 normal to the longitudinal axis of the flat plate and parallel to the width dimension of the flat plate. A second pin 28 registers with the inner hinge plate aperture 24 and secures with the body 10, permitting articulation of the inner hinge plate 22 about the second pin 28. The longitudinal axis of the second pin 28 is parallel to that of the first pin 20, so that the pivot arm 12 and the inner hinge plate 22 articulate within the same plane, with the inner hinge plate 22 inner face proximate to the pivot arm 12.

In the inner hinge plate 22 inner face is or is defined a receiver 30 for the shaped end section 16 of the pivot arm 12. The shaped end section 16 and the receiver 30 are complementarily shaped so that the shaped end section 16 registers with the receiver 30 when the inner hinge plate 22 is articulated towards the pivot arm 12. Once the shaped end section 16 registers with the receiver 30 and the inner hinge plate 22 is restrained in place, the pivot arm 12 is likewise secured in place and precluded from any further articulation until the inner hinge plate 22 is released and allowed to articulate. In one embodiment, the complementary shapes are simply a rounded, convex hemispherical tip on the shaped end section and a concave, hemispherical cavity in the inner face of the inner hinge plate 22. In another embodiment, the complementary shapes are of a conical frustrum. Other shapes to the shaped end section 16 and receiver 30 are within the scope of the invention, including but not limited to one or more tongue-and-groove slots disposed parallel to the axes of the pivot arm 12 and inner hinge plate 22, so long as the shaped end section 16 and the receiver 30 can freely engage and disengage with little force to the inner hinge plate 22, but, when engaged, will restrain articulation of the pivot arm 12.

The sling release mechanism further comprises an outer hinge plate 36. The outer hinge plate 36 is constructed similar to the inner hinge plate 22, being again in the preferred embodiment a flat plate 38 with an expanded end section and an aperture 40 defined in the expanded end section normal to the longitudinal axis and parallel to the width dimension of the flat plate 38. A third pin 42 registers with the outer hinge plate aperture 40 and is secured to the body 10, permitting articulation of the outer hinge plate 36 about the axis of the third pin 42. The axis of articulation of the outer hinge plate 36, the inner hinge plate 22 and the pivot arm 12 are parallel, and the three components articulate substantially within the same plane.

The third pin 42, about which the outer latch plate 36 articulates is disposed on the body 10 at a point where an imaginary line through the third pin 42 and the second pin 28 is parallel to the longitudinal axis of the inner hinge plate 22, when the shaped end section 16 of the pivot arm 12 has registered with the inner latch plate receiver 30. The inner and outer hinge plates 22, 36 are constructed such that, when the pivot arm 12 has engaged with the receiver 30 in the inner face of the inner hinge plate 22, the inner face of the outer hinge plate 36 can engage flush with the outer face of the inner hinge plate 22.

Figure 3:
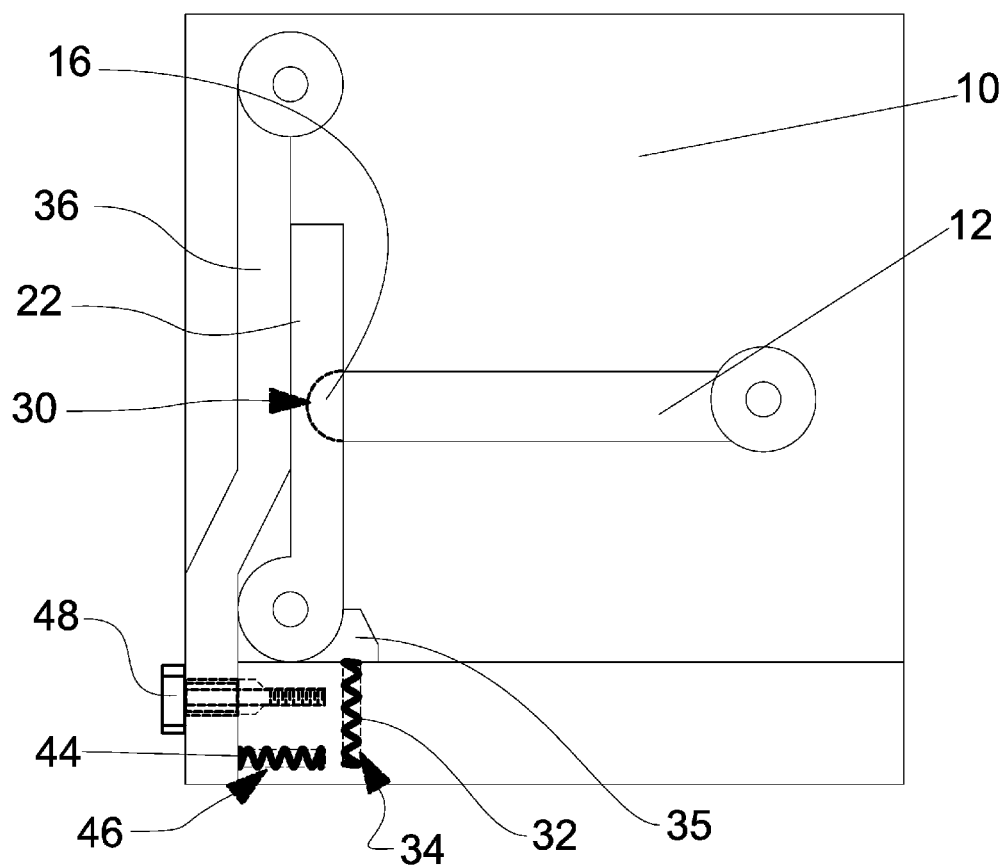
FIG. 3 is a plan view of the preferred embodiment

As shown in FIG. 3, the sling release mechanism further comprises a first torsion means, provided on the inner hinge plate 22, which applies a torque to the inner hinge plate 22 about the axis of its articulation in a direction away from the pivot arm 12. In the preferred embodiment, the first torsion means is a compression spring 32 which is disposed within a cavity or well 34 in the body 10. The depth of the cavity 34 is slightly less than the length of the compression spring 32, such that, when inserted into the well 34, one end of the compression spring 32 protrudes slightly beyond the edge of the well 34. A foot 35 is provided on the inner hinge plate 22 to engage and compress the protruding end of the compression spring 32 when the inner hinge plate 22 rotates to a position of engagement with the pivot arm 12. The first torsion means facilitates disengagement of the receiver in the inner hinge plate 22 from the shaped end section 16 of the pivot arm 12, when the inner latch plate 22 is intentionally released and allowed to articulate.

A second torsion means is further provided on the outer hinge plate 36, applying a torque to the outer hinge plate 36 about the axis of articulation in a direction away from the pivot arm 12, similar to the first torsion means on the inner hinge plate 22. However, since the outer hinge plate 36 is oriented inversely from the inner hinge plate 22, the second torsion means will apply a torque to the outer hinge plate 36 in a direction opposite from the first torsion means. If the inner hinge plate 22 is disposed as shown in FIG. 1, with its axis of articulation to the left and below the pivot arm 12, the first torsion means will apply an anti-clockwise torque to the inner hinge plate 22, while the second torsion means will apply a clockwise torque to the outer hinge plate 36.

Like the first torsion means, the second torsion means in the preferred embodiment is a compression spring 44, which is disposed in a cavity or well 46 in the body 10, which protrudes slightly from the well 46, and which engages with part of the outer hinge plate 36 as the outer hinge plate 36 contacts the inner hinge plate 22 when the inner hinge plate 22 has been engaged by the pivot arm 12.

Once the inner hinge plate 22 has engaged the pivot arm 12, and the outer hinge plate 36 has engaged the inner hinge plate 22, a releasable retainer is provided to temporarily secure the outer hinge plate 36 in place against the torque applied to the outer and inner hinge plates 22, 36, as well as any force applied to the pivot arm 12 from a sling disposed thereon. However, because of the lever arms provided by both the outer and inner hinge plates 22, 36, the force on the retainer is significantly less than the external force applied on the pivot arm 12.

In the preferred embodiment, again shown in FIG. 3, the retainer is an explosive bolt 48 securing the end of the outer hinge plate 36, distal from its aperture 40, to the body 10. This can be accomplished by drilling aligned holes in the outer hinge plate 36 and the body 10 and tapping the hole in the body 10 to accept the threads of an explosive bolt 48. An explosive bolt 48 is well known in the art of aerial parachute delivery systems, and is comprised of a frangible bolt with an embedded explosive charge which, when ignited, severs the bolt laterally. The explosive charge may be ignited by a remote or an automatic controller, which delivers an igniting electrical charge or current to the explosive at a predetermined time for release of the outer hinge plate 36.

Figure 4:
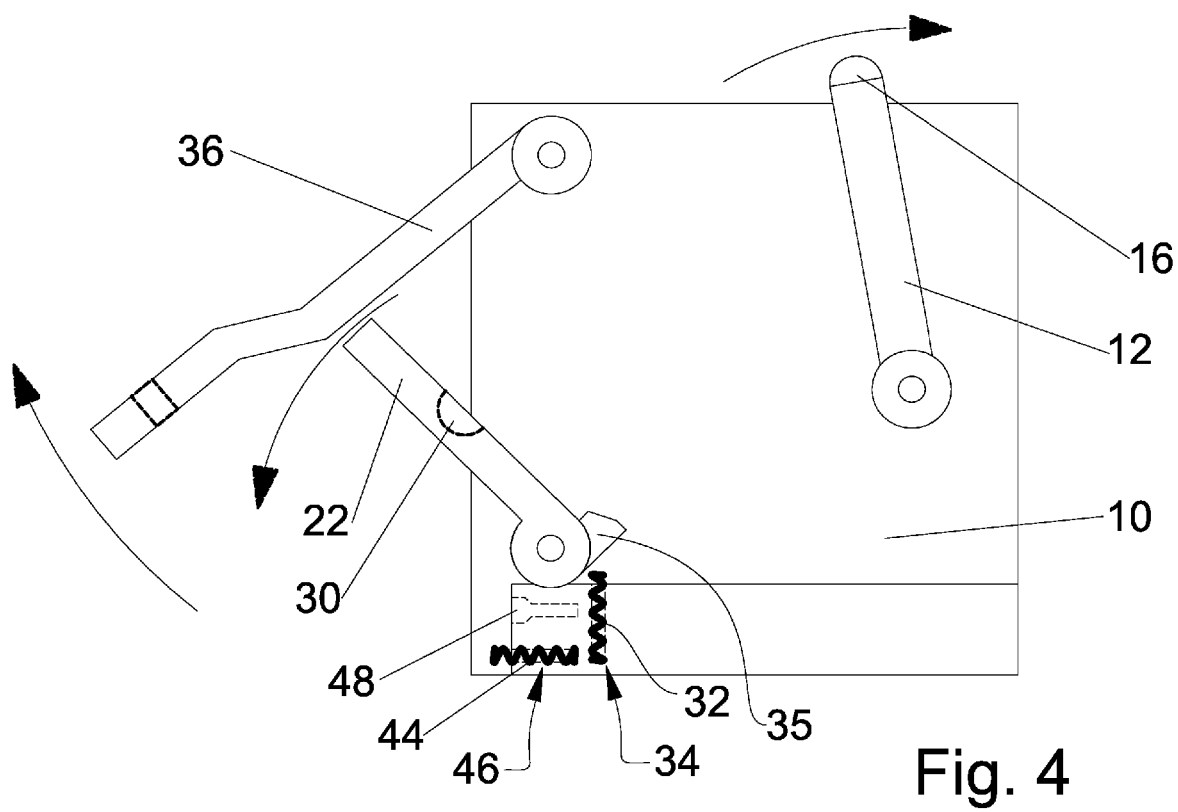
FIG. 4 is a plan view of the preferred embodiment, illustrating the operation of the sling release mechanism.

Once the release means releases the retainer securing the two hinge plates to the body, the two are free to articulate. As shown in FIG. 4, upon detonation of the explosive bolt (not shown), the outer hinge plate 36 is free to articulate clockwise, assisted in part by the force provided by the compressed compression spring 44. The outer hinge plate 36 then articulates, in the case in the layout shown in FIG. 4, clockwise. This then releases the inner hinge plate 22, which then articulates anti-clockwise, propelled in part by the force exercised by the compression spring 32 against the foot 35. Once the inner hinge plate begins to articulate, the receiver 30 disengages from the shaped end section 16 of the pivot arm 12, and the pivot arm 12 is then free to articulate, in this case, clockwise. Once the pivot arm has sufficiently articulated, a sling secured onto the pivot arm 12 is free to slide off and release from the mechanism.

Figure 5:
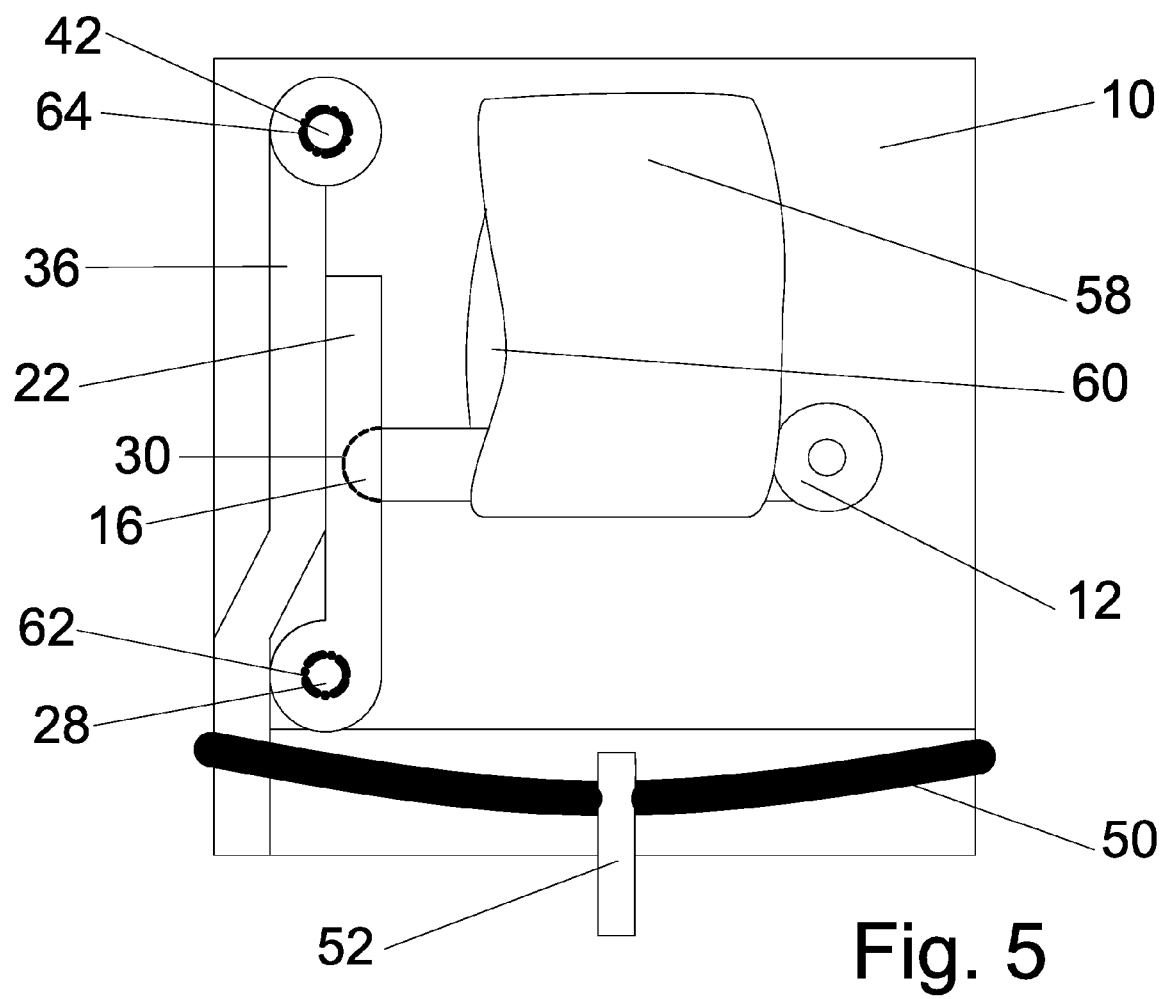
FIG. 5 is of another embodiment of the invention, showing an alternate torsion means, retainer and release means.

In other embodiments of the present invention, alternative devices may be used for the first and second torsion means. As shown in FIG. 5, torque may be provided by torsion springs 62, 64 disposed coaxially on the second and third pins 28, 42 respectively, with one end secured to the respective hinge plate 22, 36 and the other to the pin 28, 42 or body 10. However, this embodiment is less desirable because the spring would not unload and would continue to impart a torque to the respective hinge plate even after the engagement with the pivot arm 12 was released.

FIG. 5 also shows another embodiment of the retainer and release means. Here, the retainer comprises a piece of cord in a loop, commonly called a "cut loop" 50 in the art, which circumscribes the outer and inner hinge plates 22, 36 and, optionally, part or all of the body 10. A pyrotechnic cord cutter 52, well known in the art, is disposed on the cut loop 50. The cord cutter 52 has an aperture through which passes the cord of the cut loop 50. Within the cord cutter 52 is a knife edge which is propelled by a small pyrotechnic charge. The charge can be detonated by an electric signal sent automatically or remotely. When an electric signal is provided to the cord cutter 52, the pyrotechnic charge ignites, propelling the knife edge through the cord and severing the cut loop 50. The two hinge plates 22, 36 are then free to articulate away from engagement with the pivot arm 12.

FIG. 5 further shows a sling 58 secured to the pivot arm 12 by a loop 60 at the end of the sling 58.

In another embodiment, shown in FIG. 2, the first and second torsion means are found in and as part of the second and third pins 28, 42, wherein the second and third pins 28, 42 are rigidly secured to the respective inner and outer hinge plates 22, 36 and are fabricated of an elastic material, such as a polymeric elastomer or spring steel, in part or in toto, which can elastically twist and provide a torque on the respective hinge plates as those hinge plates are articulated on the two pins 28, 42. This is commonly referred to in the art as a torsion bar. This torsion bar has a similar disadvantage of the other alternative embodiments, in that a torque is still applied even when the respective hinge plates 22, 36 rotates at angles beyond that sufficient to disengage the pivot arm 12 from the inner hinge plate 22, but the torsion bars 28, 42 have the advantage of providing the capability of holding the two hinge plates 22, 36, after release, at a fixed angle away from the pivot arm 12, rather than freely flapping and articulating uncontrolled after release from the pivot arm 12. This can be provided by securing the two torsion bars 28, 42 to the body with the respective hinge plates 22, 36 at a desired angle after release. The torsion bars 28, 42 will provide the necessary torque when the two hinge plates 22, 36 are articulated to the position of engagement with the pivot arm 12 but, when released, will only articulate sufficiently to release the pivot arm 12. Any further articulation of either of the hinge plates 22, 36 will be corrected by the reverse torque imposed by the torsion bar 28, 42 twisted in the reverse direction.

Figure 6:
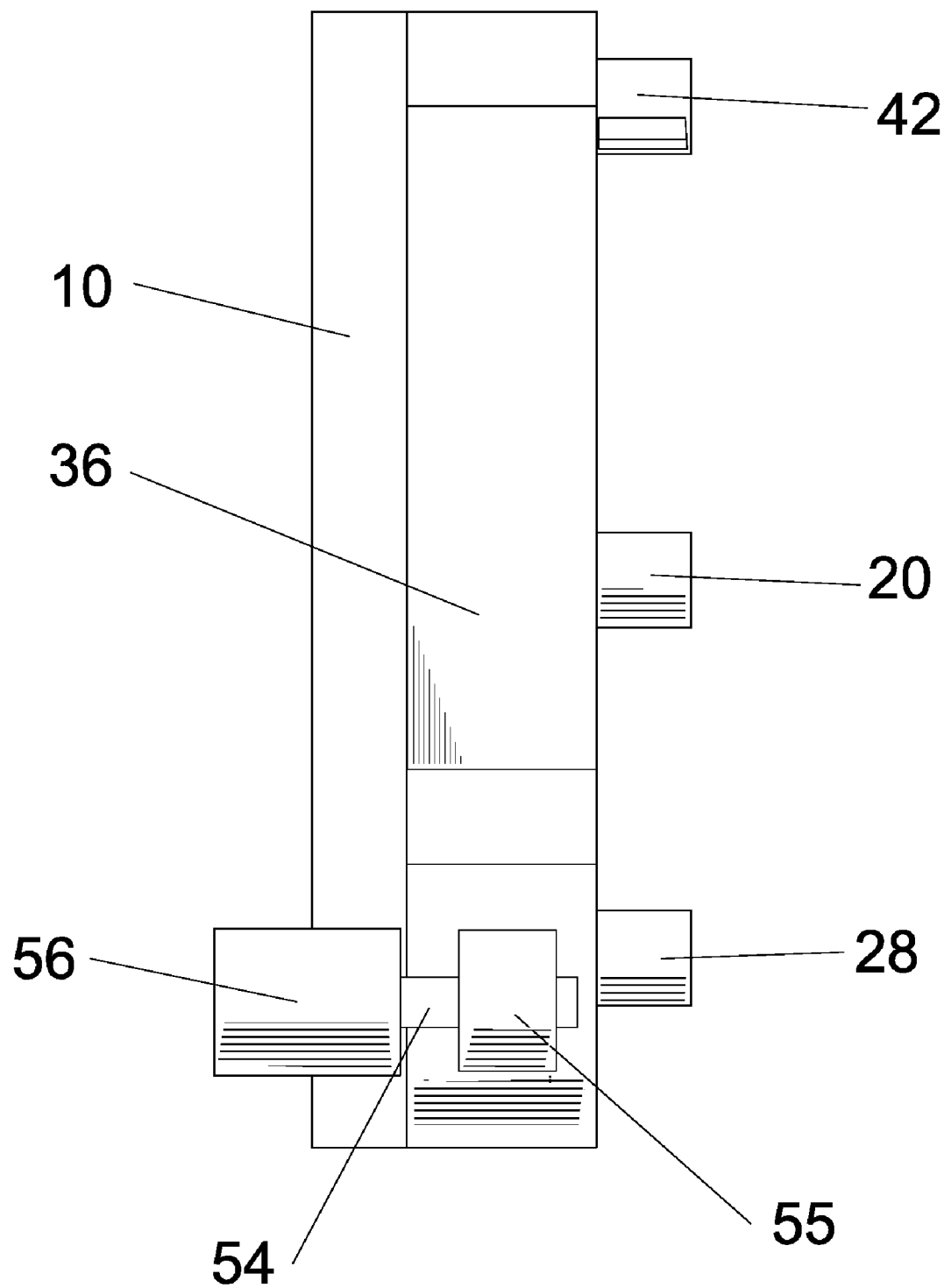
FIG. 6 is an elevational view of another embodiment of the invention, showing an alternate retainer and release means.

In another embodiment, shown in FIG. 6, the retainer is a sliding pin 54 which engages a hasp 55 mounted on the outer hinge plate 36 with either the body 10 or the inner hinge plate 22. The sliding pin 54 is translationally operated by an electric solenoid 56. When the inner hinge plate (hidden from view) and outer hinge plates 36 are positioned to engage the pivot arm (hidden from view), the solenoid 56 is de-energized to register the sliding pin 54 with the outer hinge plate 36. When the pivot arm (hidden from view) is desired to be released, the electrical power to the solenoid 56 is energized on, the sliding pin 54 withdraws from the hasp 55 and the outer hinge plate 36 is released.

Another embodiment of the invention comprises a plurality of the single sling mechanism described above. In this embodiment, shown in FIG. 7, a body 10 has a plurality of pivot arms 12 disposed therein, preferably on a common or concentric axis. A set of inner and outer hinge plates 22, 36, as described above, can be provided for each of the plural pivot arms 12. Each outer hinge plate 36 may have its own, dedicated retainer and release means, such as a separate explosive bolt. This would allow release of each pivot arm 12 and its associated sling independently. Alternatively, one set of inner and outer hinge plates 22, 36 may be provided. The single inner hinge plate 22 would have multiple receivers disposed in its inner face, the number of which equaling the number of pivot arms 12.

Figure 7:
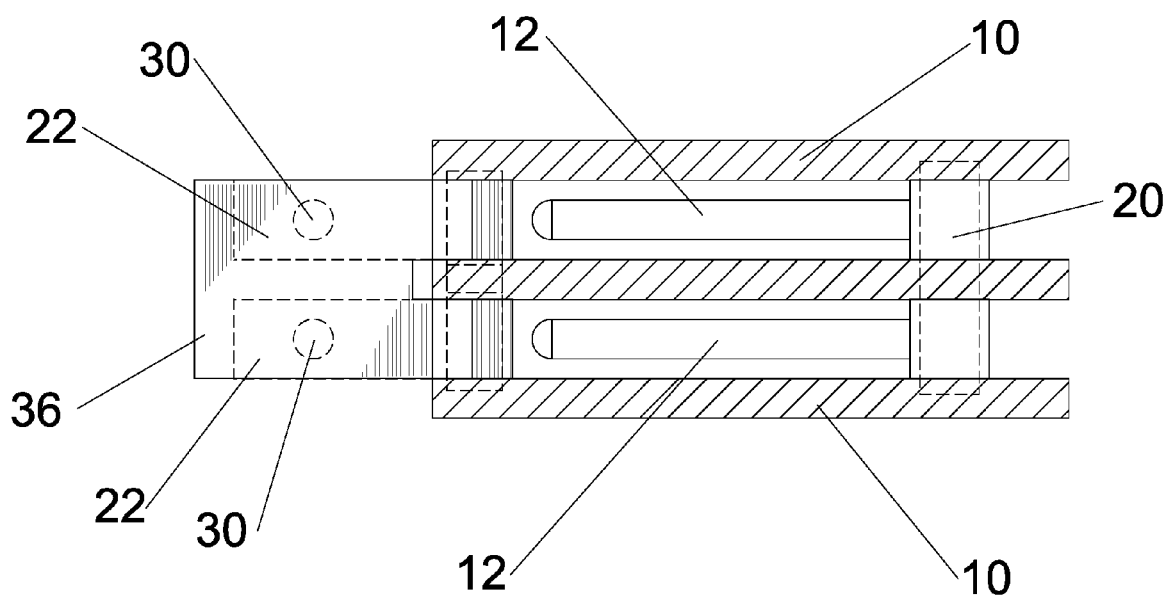
FIG. 7 is an illustration of an alternate embodiment of the invention, illustrating multiple pivot arms.

Another alternative of this plural sling embodiment is one having a plurality of pivot arms 12, capable of securing and then releasing multiple slings. This may find use where several drogue parachutes may be deployed and then released in series, to decelerate a cargo incrementally. The plurality of pivot arms may be secured by a plurality of inner and outer hinge plates 22, 36 operating in a similar manner as a single sling release mechanism, in which each inner hinge plate has one receiver 30 securing one pivot arm 12, and each outer hinge plate 36 secures one inner hinge plate 22. Alternatively, larger inner and outer hinge plates 22, 36 can be provided which can individually secure multiple pivot arms 12 or inner hinge plates 22, respectively. As shown in FIG. 7, one embodiment has two pivot arms 12 articulating on a common first pin 20. The pivots arms 12 each engage with an individual inner hinge plate 22 with a single receiver 30. However, as shown, the two inner hinge plates 22, shown in hidden view, would be secured by a single outer hinge plate 36. This outer hinge plate 36 can be held in place with the various retainers and release means described in the other embodiments.

While various embodiments of the invention have been described above, it should be understood that they have been presented by way of example, and not of limitation. It will be apparent to persons skilled in the relevant art that various changes in form and detail may be made therein without departing from the spirit, scope or application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A sling release mechanism, comprising:
   a. a body;
   b. a pivot arm having a shaped end section and articulating with the body;
   c. an inner hinge plate articulating with the body and adapted to releasably engage the shaped end section of the pivot arm;
   d. a first torsion means, wherein the first torsion means applies a torque to the articulation of the inner hinge plate;
   e. an outer hinge plate articulating with the body;
   f. a second torsion means, wherein the second torsion means applies a torque to the articulation of the outer hinge plate in a direction opposite of the first torsion means;
   g. a releasable retainer, wherein the releasable retainer restrains the articulation of the outer hinge plate when subjected to a torque from the second torsion means; and
   h. means for releasing the releasable retainer.

2. The sling release mechanism of claim 1, wherein the first torsion means is selected from the group consisting of a compression spring, a tension spring, a torsion spring and a torsion bar.

3. The sling release mechanism of claim 1, wherein the second torsion means is selected from the group consisting of a compression spring, a tension spring, a torsion spring and a torsion bar.

4. The sling release mechanism of claim 1, wherein the releasable retainer is a frangible bolt and the means for releasing is a pyrotechnic charge.

5. The sling release mechanism of claim 1, wherein the release retainer is a removable pin.

6. The sling release mechanism of claim 5, wherein the means for releasing is a solenoid.

7. The sling release mechanism of claim 1, wherein the release retainer is a cord loop.

8. The sling release mechanism of claim 7, wherein the means of release is an explosive cord cutter.

9. A multiple sling release mechanism, comprising:
   a. a body;
   b. a plurality of pivot arms, wherein each pivot arm has a shaped end section and articulates with the body;
   c. one or more inner hinge plates, wherein each inner hinge plate articulates with the body and is adapted to releasably engage the shaped end section of at least one pivot arm;
   d. one or more first torsion means, wherein each first torsion means applies torque to the articulation of one or more inner hinge plates;
   e. one or more outer hinge plates, wherein each outer hinge plate articulates with the body;
   f. one or more second torsion means, wherein each second torsion means applies torque to the articulation of one or more outer hinge plates;
   g. one or more releasable retainers, wherein each retainer restrains the articulation of at least one outer hinge plate when subjected to a torque from a second torsion means; and
   h. one or more release means, each for releasing a retainer from restraint of an outer hinge plate.

10. The multiple sling release mechanism of claim 9, wherein the number of pivot arms, inner hinge plates and outer hinge plates are equal.

11. The multiple sling release mechanism of claim 9, wherein the number of inner and outer hinge plates are equal and a whole number divisor of the number of pivot arms.

12. The multiple sling release mechanism of claim 9, wherein the plurality of pivot arms articulate about a common axis.

13. The multiple sling release mechanism of claim 9, wherein each of the one or more first torsion means is selected from the group comprising a compression spring, a torsion spring, a tension spring and a torsion bar.

14. The multiple sling release mechanism of claim 9, wherein each of the one or more second torsion means is selected from the group comprising a compression spring, a torsion spring, a tension spring and a torsion bar.

15. The multiple sling release mechanism of claim 9, wherein one or more of the releasable retainers is a frangible bolt and the means for releasing is a pyrotechnic charge.

16. The multiple sling release mechanism of claim 9, wherein at least one of the release retainers is a removable pin.

17. The sling release mechanism of claim 16, wherein the means for releasing the at least one removable pin is a solenoid.

18. The sling release mechanism of claim 9, wherein at least one of the release retainers is a cord loop.

19. The sling release mechanism of claim 18, wherein the means of releasing the at least one cord loop is an explosive cord cutter.

* * * * *